(12) United States Patent
Kim et al.

(10) Patent No.: US 10,499,737 B2
(45) Date of Patent: Dec. 10, 2019

(54) SLIDE DEVICE

(71) Applicant: SEGOS CO., LTD., Incheon (KR)

(72) Inventors: Duc Hoi Kim, Incheon (KR); Byeong Cheon Jang, Incheon (KR)

(73) Assignee: SEGOS CO., LTD., Incheon (KR)

( * ) Notice: Subject to any disclaimer, the term of this patent is extended or adjusted under 35 U.S.C. 154(b) by 60 days.

(21) Appl. No.: 15/574,219

(22) PCT Filed: Jan. 4, 2016

(86) PCT No.: PCT/KR2016/000003
§ 371 (c)(1),
(2) Date: Nov. 15, 2017

(87) PCT Pub. No.: WO2016/186288
PCT Pub. Date: Nov. 24, 2016

(65) Prior Publication Data
US 2018/0132615 A1    May 17, 2018

(30) Foreign Application Priority Data

May 19, 2015  (KR) .................. 10-2015-0069613
Sep. 2, 2015   (KR) .................. 10-2015-0124400

(51) Int. Cl.
*A47B 88/477*   (2017.01)
*A47B 88/483*   (2017.01)
*F16C 29/02*    (2006.01)

(52) U.S. Cl.
CPC .......... *A47B 88/477* (2017.01); *A47B 88/483* (2017.01); *F16C 29/02* (2013.01)

(58) Field of Classification Search
CPC ... A47B 88/477; A47B 88/467; A47B 88/483; A47B 88/49; A47B 2210/0018; A47B 2210/0094; A47B 2210/463; F16C 29/02
(Continued)

(56) References Cited

U.S. PATENT DOCUMENTS 6,672,692 B2 *  1/2004  Weng ............... A47B 88/467
                                              312/319.1
7,244,005 B1 *  7/2007  Lu .................. A47B 88/467
                                              312/319.1
(Continued)

FOREIGN PATENT DOCUMENTS

JP    2011-234828 A   11/2011
JP      201349946 A    3/2013
(Continued)

OTHER PUBLICATIONS

International Search Report for PCT/KR2016/000003.
(Continued)

*Primary Examiner* — Daniel J Troy
*Assistant Examiner* — Timothy M Ayres
(74) *Attorney, Agent, or Firm* — The PL Law Group, PLLC

(57) ABSTRACT

A slide device includes a body provided at an end portion of a side of the fixed rail, and provided with a guide path, a slider coupled to the body, and selectively slidably movable along a longitudinal direction of the body during slidable movement of the transfer rail, a transfer pin coupled to the slider to be movable simultaneously at the time of movement of the slider, and movable along the guide path, and a damper provided in the body, and configured such that a rod end portion thereof is connected to the transfer pin. The slide device employs a structure in which the rod end part of the damper is detachably coupled to a sub-transfer pin without being directly coupled to the slider, and thereby can maximally prevent occurrence of a problem where the durability of the slider degrades during long-term reciprocating movement.

5 Claims, 12 Drawing Sheets

(58) Field of Classification Search
USPC .......................................................... 312/333
See application file for complete search history.

(56) References Cited

U.S. PATENT DOCUMENTS

| | | | | |
|---|---|---|---|---|
| 7,740,327 B2* | 6/2010 | Hsieh | ................... | A47B 88/473 |
| | | | | 312/333 |
| 7,980,640 B2* | 7/2011 | Yang | ................... | A47B 88/493 |
| | | | | 312/319.1 |
| 8,132,873 B2* | 3/2012 | Yang | ................... | A47B 88/467 |
| | | | | 312/333 |
| 8,147,010 B2* | 4/2012 | Chen | ................... | A47B 88/467 |
| | | | | 312/333 |
| 8,393,693 B2* | 3/2013 | Juan | ................... | A47B 88/467 |
| | | | | 312/333 |
| 8,590,989 B2* | 11/2013 | Lowe | ................... | A47B 88/467 |
| | | | | 312/319.1 |
| 8,696,077 B2* | 4/2014 | Huang | ................ | A47B 88/467 |
| | | | | 312/319.1 |
| 8,714,671 B2* | 5/2014 | Huang | ................ | A47B 88/467 |
| | | | | 312/319.2 |
| 9,635,938 B2* | 5/2017 | Kim | ................... | A47B 88/467 |
| 2009/0091224 A1* | 4/2009 | Wu | ................... | A47B 88/467 |
| | | | | 312/333 |
| 2011/0043087 A1 | 2/2011 | Shih | | |
| 2013/0088132 A1 | 4/2013 | Hammerle | | |
| 2014/0097732 A1* | 4/2014 | Xiao | ................... | A47B 88/467 |
| | | | | 312/319.1 |

FOREIGN PATENT DOCUMENTS

| | | | |
|---|---|---|---|
| KR | 10-2007-0096813 | A | 10/2007 |
| KR | 10-2008-0102529 | A | 11/2008 |
| KR | 10-2010-0006176 | A | 1/2010 |
| KR | 10-2011-0104958 | A | 9/2011 |
| KR | 10-1398127 | B1 | 5/2014 |

OTHER PUBLICATIONS

European Search Report for EP16796615.9 from European patent office in a counterpart European patent application dated Oct. 16, 2018.

* cited by examiner

SLIDE DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/000003, filed Jan. 4, 2016, which claims priority to the benefit of Korean Patent Application No. 10-2015-0069613 filed on May 19, 2015 and 10-2015-0124400 filed on Sep. 2, 2015 in the Korean Intellectual Property, the entire contents of which are incorporated herein by reference.

TECHNICAL FIELD

The present invention relates generally to a slide device. More particularly, the present invention relates to a slide device configured such that a sub-transfer pin is provided between a transfer pin and a damper, wherein the sub-transfer pin is detachably coupled to both the transfer pin and the damper, and is rotatable about the transfer pin.

BACKGROUND ART

In general, a sliding type drawer body is provided in a main body of furniture, refrigerator or various sorting boxes to be openable by sliding, and is used for storing articles.

The main body is provided with a drawer body installation space, and the sliding type drawer body is opened and closed by mutual rolling contact with a slide device slidably provided on inner walls of the installation space and opposite side walls of the drawer body, respectively.

The slide device includes a fixed rail fixed to a main body, and a transfer rail slidably movable relative to the fixed rail so as to induce opening or closing movement of a drawer body, wherein the fixed rail is provided with a separate damper that reduces the draw-out and draw-in speed of the transfer rail to a predetermined speed or less.

However, the conventional slide device is configured such that the rod end portion of the damper is connected to a slider provided in the transfer rail, and in this case, the slider should be provided with a first coupling structure for being coupled with the rod end portion of the damper, and a second coupling structure for being coupled with the transfer pin movable along the guide path provided in the fixed rail.

In other words, the conventional slide device is problematic in that by the above-mentioned characteristics, the structure of the slider is complicated, and also the durability of the slider is reduced during long-term reciprocating movement because both the rod end portion of the damper and the transfer pin are coupled thereto.

SUMMARY

Accordingly, the present invention has been made keeping in mind the above problems occurring in the related art, and an object of the present invention is to provide a slide device capable of pushing a drawer body by self-closing and soft-closing, and having a structure, in which a sub-transfer pin is provided between a transfer pin and a damper, wherein the sub-transfer pin is detachably coupled to both the transfer pin and the damper, and is rotatable about the transfer pin.

Another object of the present invention is to provide a slide device configured such that the rod end portion of the damper is detachably coupled to the sub-transfer pin without being directly coupled to the slider, whereby it is possible to maximally prevent occurrence of a problem where the durability of the slider degrades during long-term reciprocating movement.

In order to achieve the above object, the present invention provides a slide device, which includes a fixed rail fixed to a main body, and a transfer rail slidably movable relative to the fixed rail so as to induce opening or closing movement of a drawer body, the slide device including: a body provided at an end portion of a side of the fixed rail, and provided with a guide path; a slider coupled to the body, and selectively slidably movable along a longitudinal direction of the body during slidable movement of the transfer rail; a transfer pin coupled to the slider to be movable simultaneously at the time of movement of the slider, and movable along the guide path; and a damper provided in the body, and configured such that a rod end portion thereof is connected to the transfer pin.

According to the slide device of the present invention, since the rod end portion of the damper is detachably coupled to the sub-transfer pin without being directly coupled to the slider, it is possible to maximally prevent occurrence of a problem where the durability of the slider degrades during long-term reciprocating movement.

Further, since the rod end portion of the damper is directly connected to the sub-transfer pin, and the transfer pin is hingedly rotatable about the sub-transfer pin according to the reciprocating movement of the transfer rail, it is possible to further simplify the coupling structure of the slider and the surrounding structure to facilitate the coupling and separation, and it is possible to increase the durability of the slider. For reference, the present invention has an excellent durability compared to the case, for example, where the rod end portion of the damper is directly connected to the slider, since the impact due to the operation of the damper is not directly transmitted to the slider.

Further, since the rod end portion of the damper, the transfer pin, and the sub-transfer pin are detachably coupled to each other, it is possible to increase the efficiency of part replacement and make it possible to perfoLm a rapid part replacement work compared to the case, for example, where the rod end portion of the damper is integrally coupled to the sub-transfer pin or the sub-transfer pin is integrally coupled to the transfer pin.

BRIEF DESCRIPTION OF DRAWINGS

FIGS. 7 to 12 show views of transfer relationship of associated parts as the transfer rail moves in the slide device according to the embodiment of the present invention, wherein FIG. 8 shows a view of coupling relationship and positional relationship among a rod end portion of a damper, the transfer pin, and the sub-transfer pin based on FIG. 7, and FIG. 12 shows a view of coupling relationship and positional relationship among the rod end portion of the damper, the transfer pin, and the sub-transfer pin based on FIG. 11.

DETAILED DESCRIPTION

Figure 1:
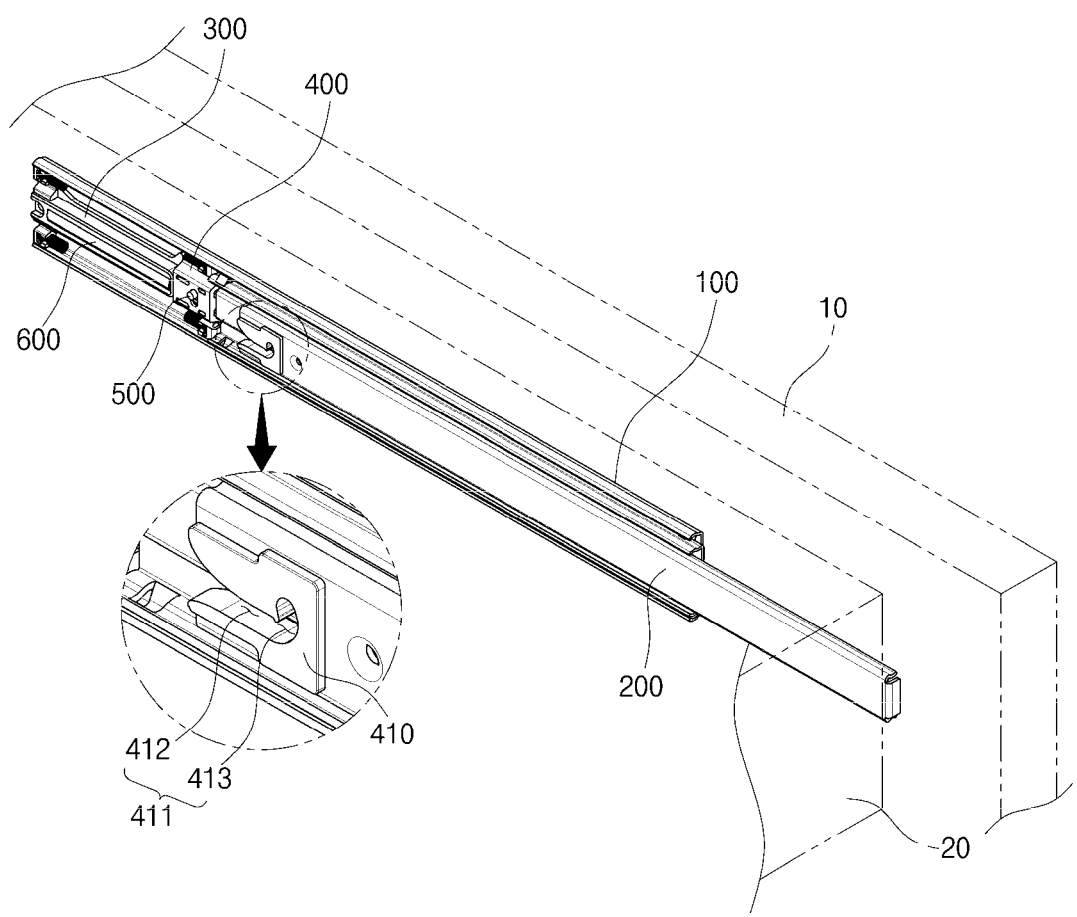
FIG. 1 shows a view of a state where a slide device according to an embodiment of the present invention is installed.

Hereinbelow, a preferred embodiment of the present invention will be described in more detail with reference to the accompanying drawings. However, it should be understood that the embodiment of the present invention may be changed to a variety of embodiments and the scope and spirit of the present invention are not limited to the embodiment described hereinbelow. The embodiment of the present invention described hereinbelow is provided for allowing those skilled in the art to more clearly comprehend the present invention. Throughout the drawings, the same reference numerals will refer to the same or like parts.

A slide device according to a preferred embodiment of the present invention is provided to allow drawers of electronic devices, specifically drawer refrigerators or various furniture, to be slidably movable forward and backward. To be more specific, the present invention employs a structure, in which the drawer body is self-closing relative to the main body by a user pushing a drawer body that is pulled out, and further, the drawer body is soft-closing through buffering power of a damper. Herein, self-closing means that when the user intends to close the drawer body that is pulled out, the drawer body is automatically closed through a simple push operation, and soft-closing means that the drawer body is closed at A speed in the beginning when the drawer body is pushed into the main body and then closed at B speed after more than a predetermined portion of the drawer is closed, and here, the B speed is smaller than the A speed.

Figure 2:
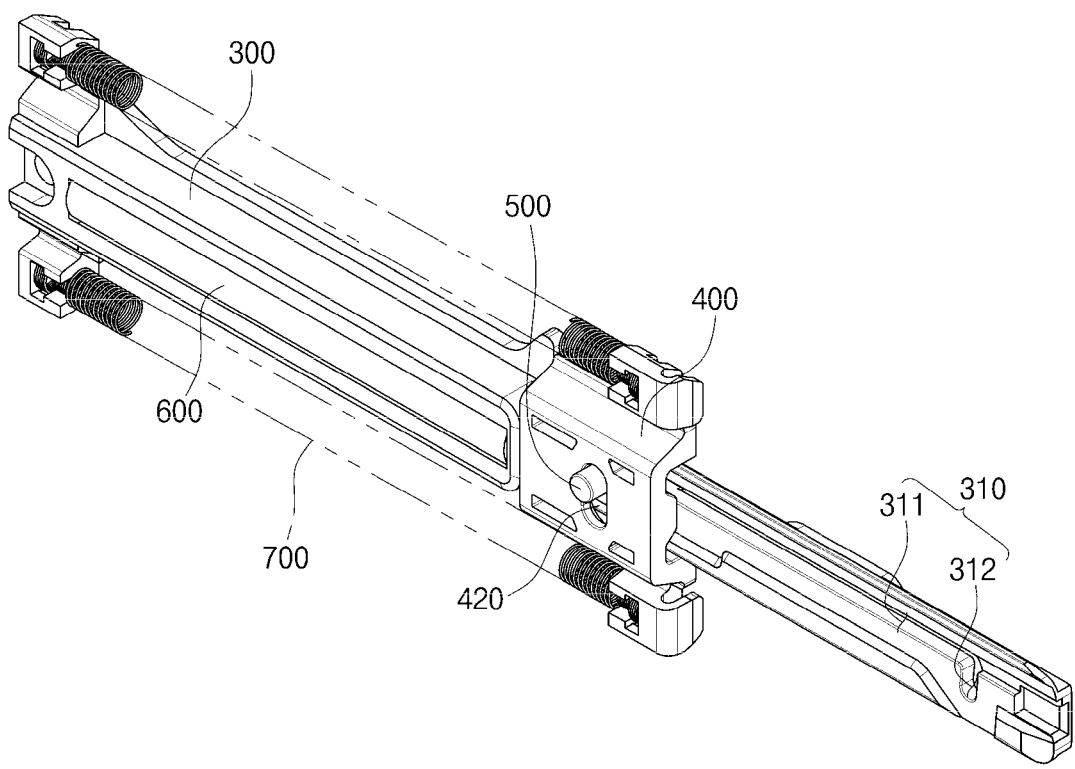
FIG. 2 shows a partial view of the slide device according to the embodiment of the present invention.
Figure 3:
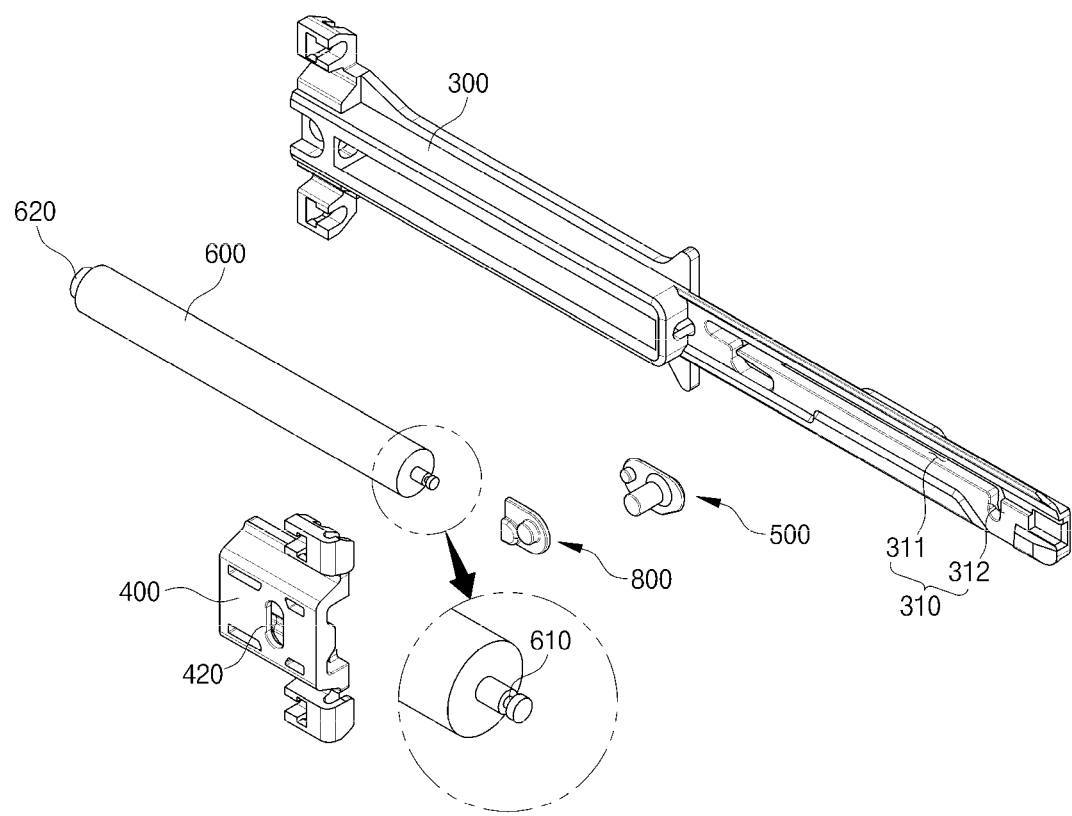
FIG. 3 shows a front exploded perspective view of FIG. 2.
Figure 4:
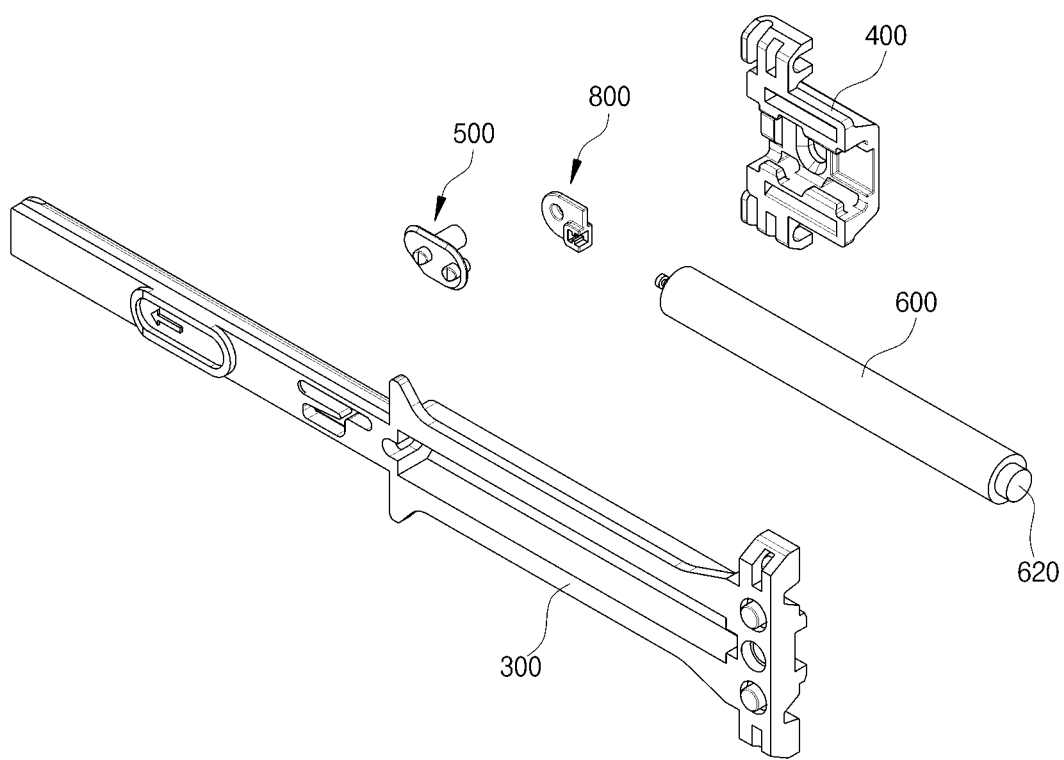
FIG. 4 shows a rear exploded perspective view of FIG. 2.

FIG. 1 shows a view of a state where a slide device according to an embodiment of the present invention is installed; FIG. 2 shows a partial view of the slide device according to the embodiment of the present invention; FIG. 3 shows a front exploded perspective view of FIG. 2; and FIG. 4 shows a rear exploded perspective view of FIG. 2.

Figure 5A:
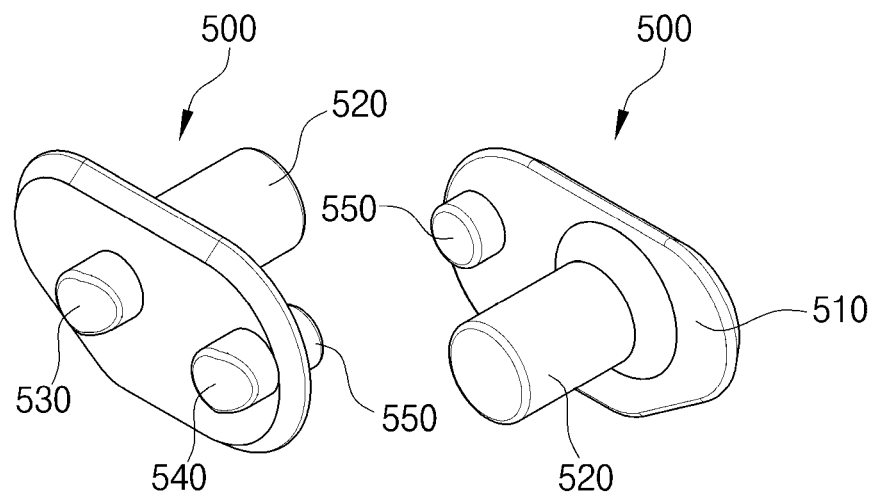
FIG. 5A shows front and rear exploded perspective views of a transfer pin of the slide device according to the embodiment of the present invention.
Figure 5B:
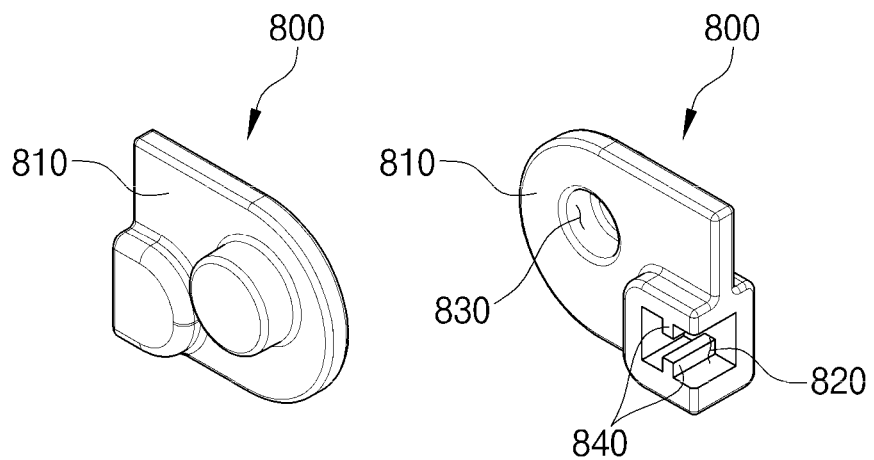
FIG. 5B shows front and rear exploded perspective views of a sub-transfer pin thereof.
Figure 6:
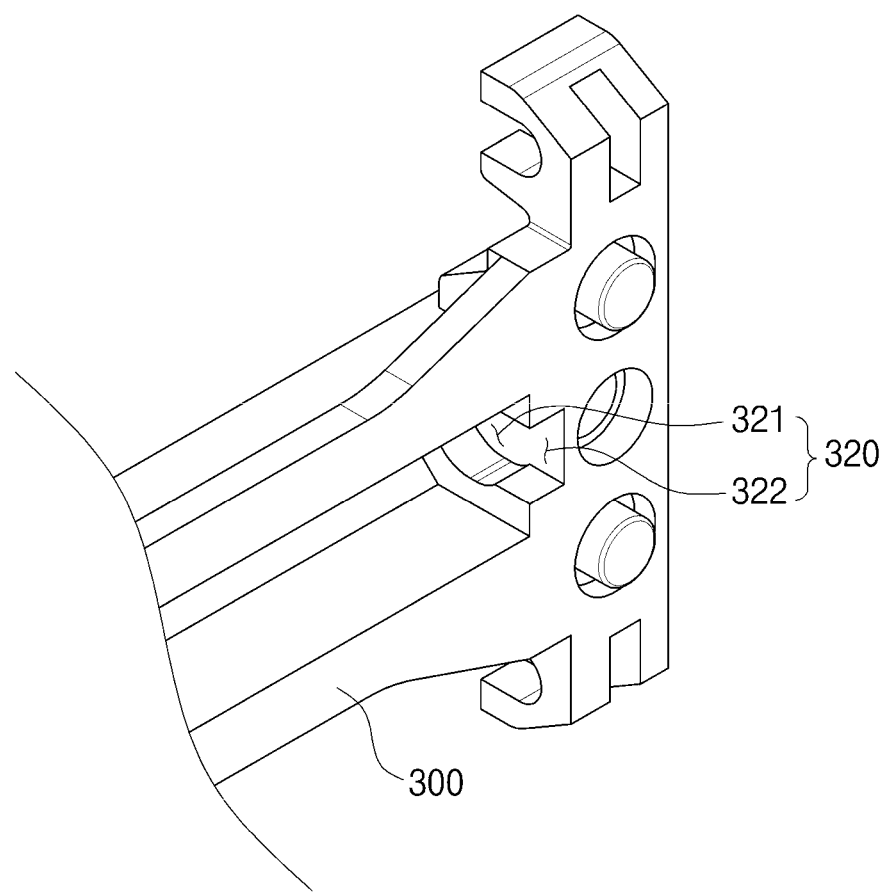
FIG. 6 shows a partial view of a body of the slide device according to the embodiment of the present invention.

FIG. 5A shows front and rear exploded perspective views of a transfer pin of the slide device according to the embodiment of the present invention, and FIG. 5B shows front and rear exploded perspective views of a sub-transfer pin thereof; and FIG. 6 shows a partial view of a body of the slide device according to the embodiment of the present invention.

Hereinbelow, the present invention will be described with reference to an embodiment.

As shown in FIGS. 1 to 4, a slide device according to an embodiment of the present invention includes: a fixed rail 100 fixed to a main body 10; and a transfer rail 200 slidably movable relative to the fixed rail 100 so as to induce opening or closing movement of a drawer body 20.

As shown in FIGS. 2 to 4, the present invention includes: a body 300 provided at an end portion of a side of the fixed rail 100, and provided with a guide path 310; a slider 400 coupled to the body 300, and selectively slidably movable along a longitudinal direction of the body 300 during slidable movement of the transfer rail 200; a transfer pin 500 coupled to the slider 400 to be movable simultaneously at the time of movement of the slider 400, and movable along the guide path 310; a damper 600 provided in the body 300, and configured such that a rod end portion thereof is connected to the transfer pin 500; and elastic members 700 connecting between the body 300 and the slider 400 and configured to be elastically compressed or stretched when the transfer rail 200 is transferred.

The present invention further includes a sub-transfer pin 800 interposed between the rod end portion of the damper and the transfer pin 500, and configured to be hingedly rotatable relative to the transfer pin 500 and to be movable simultaneously at the time of movement of the rod end portion.

Firstly, the fixed rail 100 can be fixed to various parts such as an inner wall surface of a refrigerator or furniture by using screws or the like. Hereinafter, reference will be made to the case of being provided in a refrigerator, for convenience of explanation.

Next, the transfer rail 200 is provided to be slidably movable relative to the fixed rail 100 while being connected to the drawer body 20 to allow the drawer body 20, specifically a drawer of a drawer refrigerator, to be pulled out from and pushed into the main body 10. The transfer rail 200 may be fixedly coupled to the drawer body 20 by using a separate bracket (not shown), etc.

Next, as shown in FIGS. 2 to 4, the body 300 is fixedly provided at an end portion of a side of the fixed rail 100, specifically, at a rear end portion thereof, and is provided with the guide path 310.

Herein, the guide path 310 includes: a first guide path 311 extending along a longitudinal direction of the body 300; and a second guide path 312 bent relative to the first guide path 311 while being connected to the first guide path 311 at an end portion of the first guide path 311.

For reference, as shown in FIGS. 7 to 12, in the state where the transfer rail 200 is pulled out, a second protrusion 530 of the transfer pin 500 is disposed inside the second guide path 312. After that, when the transfer rail 200 is pushed in, the position of the second protrusion 530 is changed from the inside the second guide path 312 toward the first guide path 311 by the engagement with a transfer pin-locking member 410 according to the movement of the transfer rail 200, and the position of the second protrusion 530 is changed to the first guide path 311. In order to facilitate the movement of the second protrusion 530, that is, the movement from the inside the second guide path 312 toward the first guide path 311, a round having a predetermined curvature or more may be formed at the corner where the first guide path 311 and the second guide path 312 are connected.

The present invention is configured such that when the transfer rail 200 is pushed in, the second protrusion 530 and a third protrusion 540 are moved along the first guide path 311. Here, a first protrusion 520 of the transfer pin 500 coupled to the slider 400 remains coupled to the transfer pin-locking member 410, and a self-closing motion is performed by an elastic restoring force of elastic members 700. Further, as described above, when the self-closing motion is performed, a soft-closing motion can be performed by buffering power of the damper 600.

Figure 7:
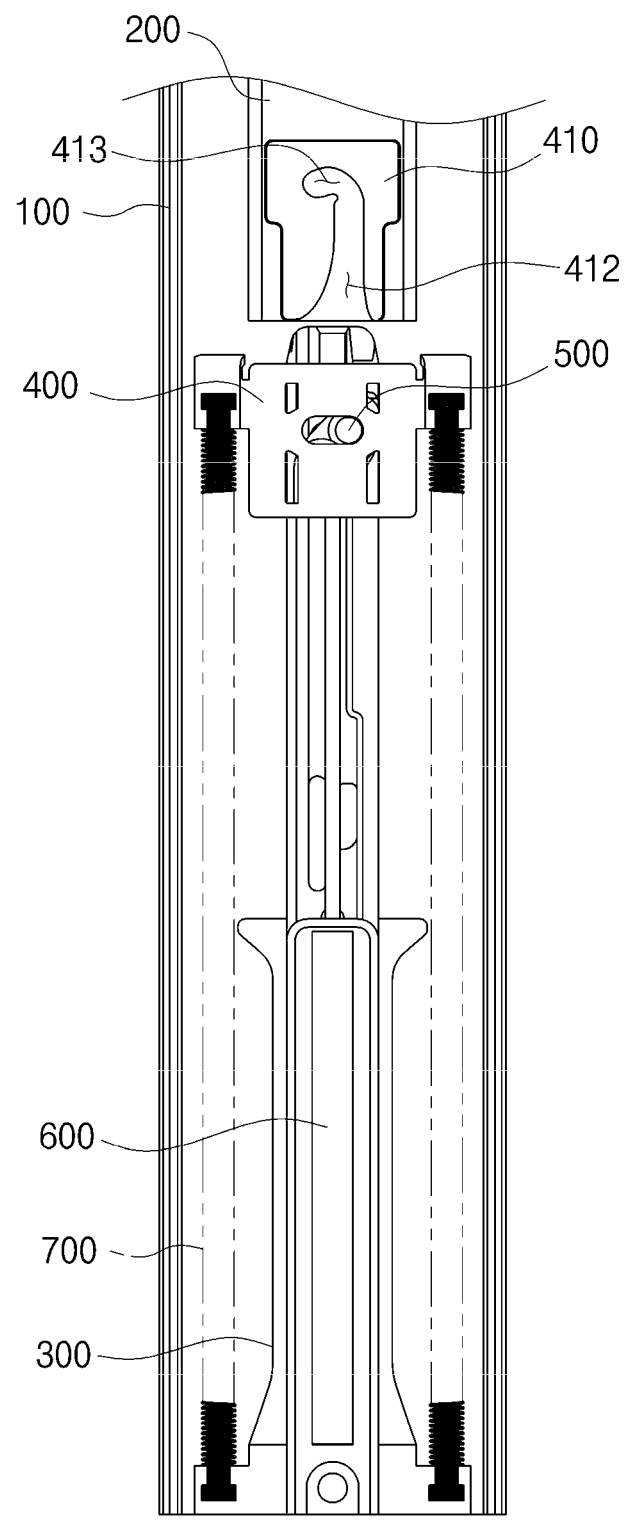
Figure 8:
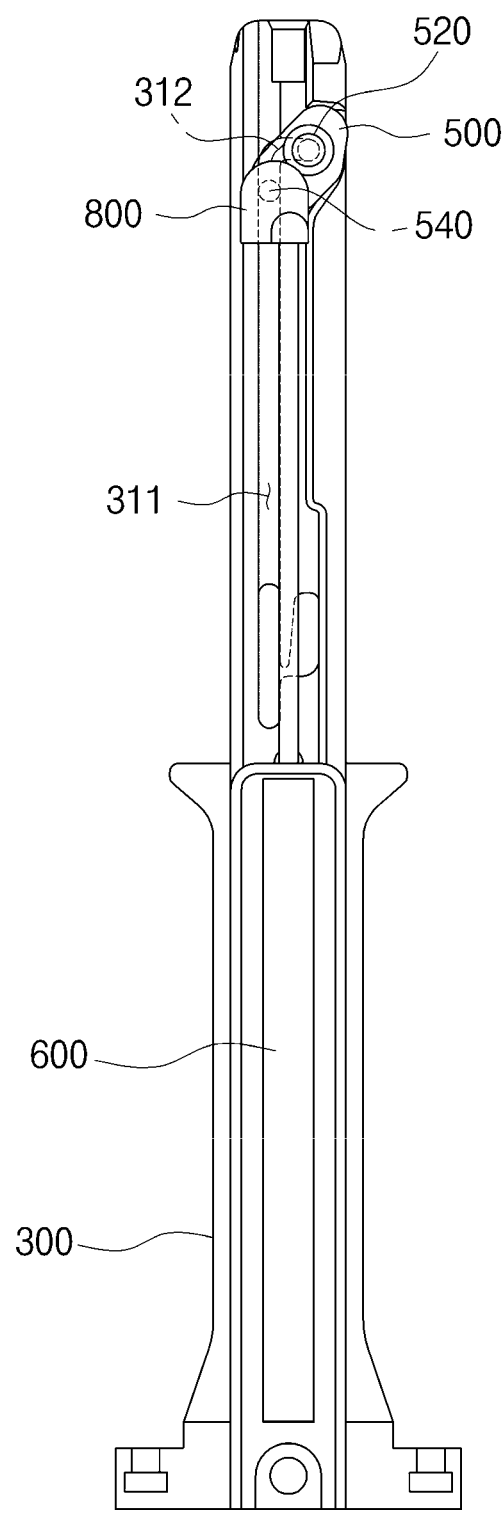
Figure 9:
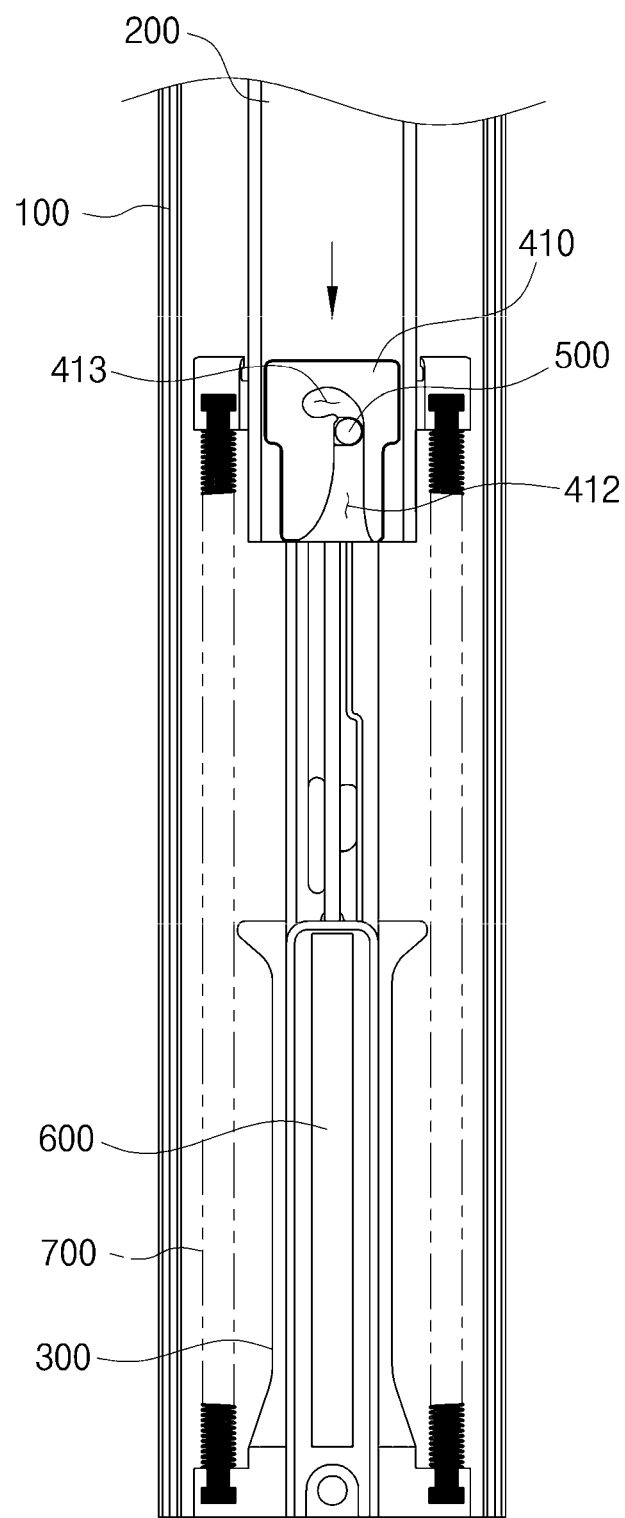
Figure 10:
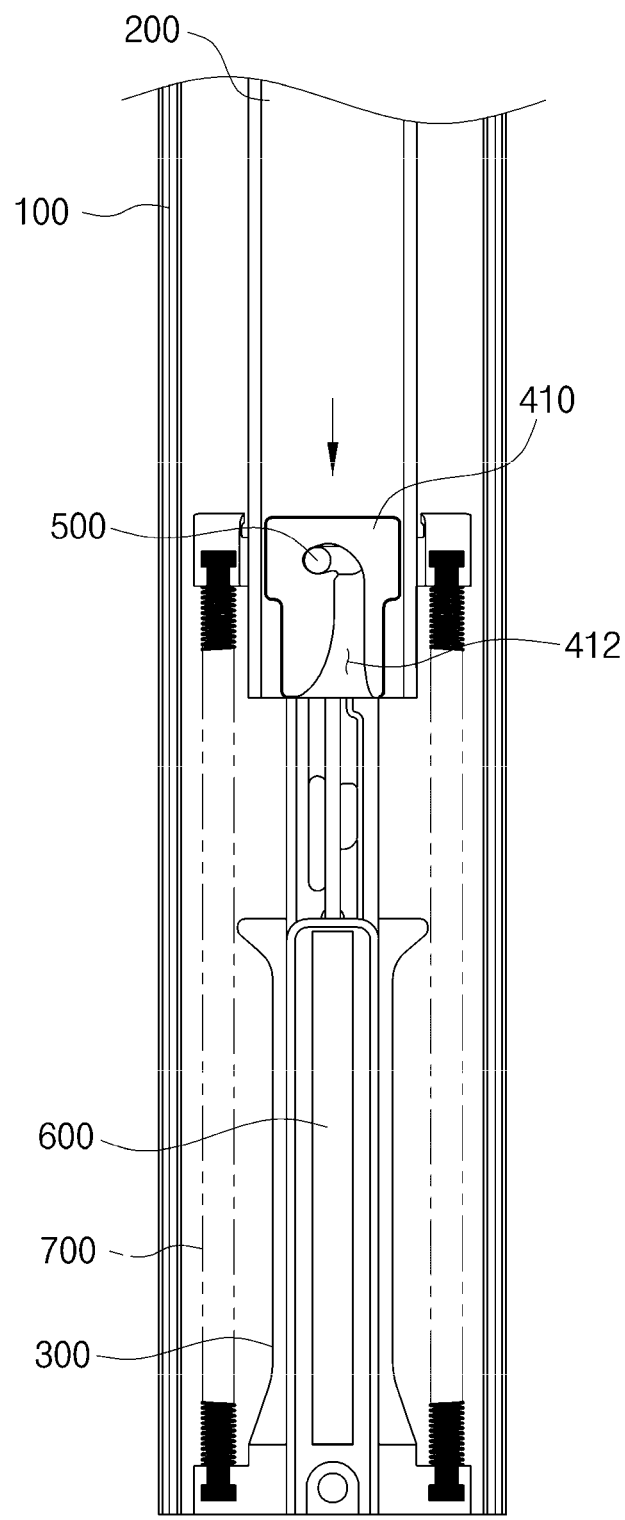
Figure 11:
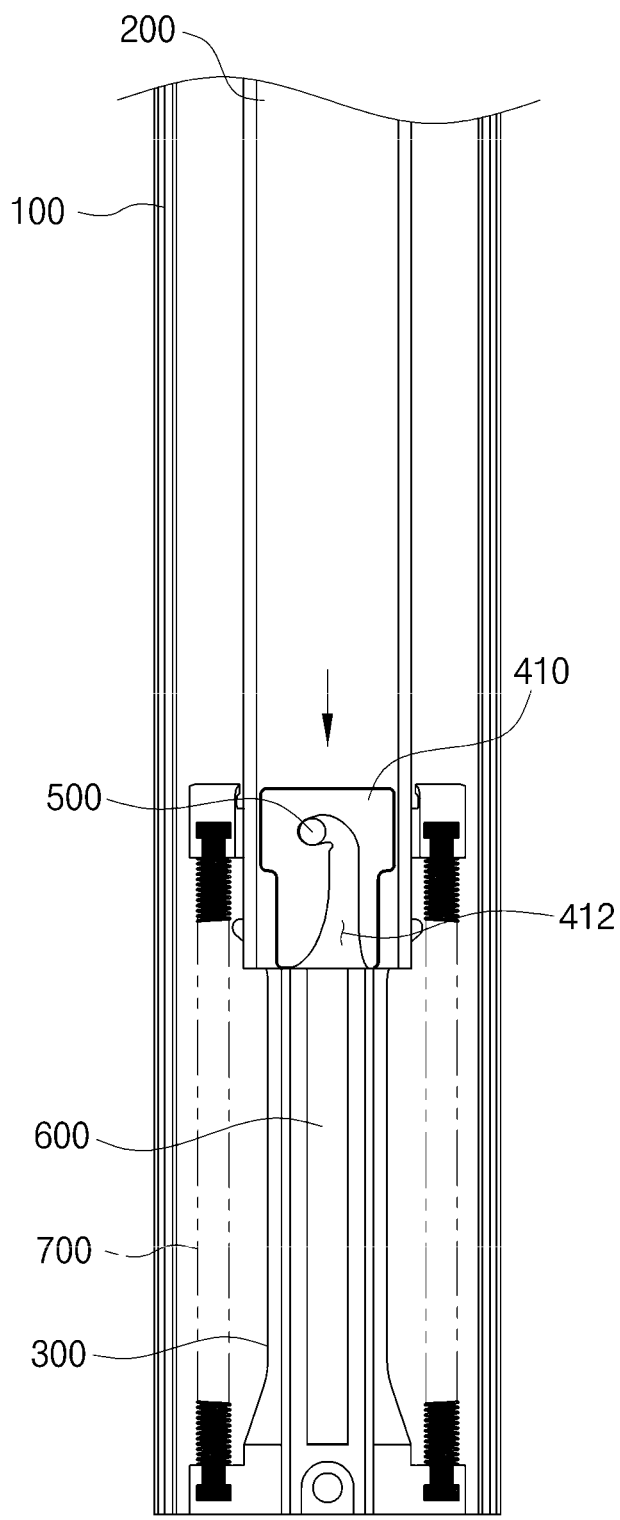
Figure 12:
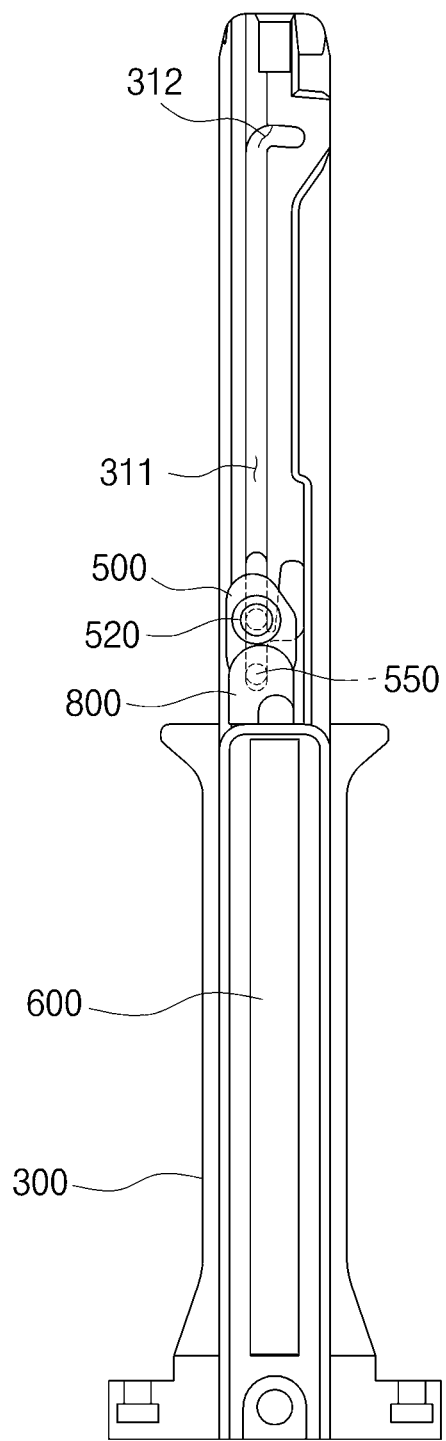

The operation of the slide device according to the embodiment of the present invention will be described below. As shown in FIGS. 7 and 8, when the transfer rail 200 is pushed in, the first protrusion 520 of the transfer pin 500 enters inside an eccentric groove 411 of the transfer pin-locking member 410, specifically, inside a first eccentric groove 412. Here, the second protrusion 530 of the transfer pin 500 is disposed in the second guide path 312.

Then, when the transfer rail 200 is further pushed in, a position of the first protrusion 520 is changed eccentrically to inside a second eccentric groove 413 by the self-closing motion of the elastic members 700. Here, the second protrusion 530 and the third protrusion 540 are disposed in the first guide path 311 by the eccentric movement of the first protrusion 520. This positional change occurs because the second eccentric groove 413 and the first guide path 311 are disposed at the same area based on a lateral width of the fixed rail 100 when the fixed rail 100 is viewed along a longitudinal direction.

Then, as shown in FIGS. 9 to 12, when the transfer rail 200 is furthermore pushed in, the second protrusion 530 and the third protrusion 540 are moved further backward along the first guide path 311. In this case, the slider 400 and the transfer pin 500 are moved backward by the elastic restoring force of the elastic members 700. Here, the transfer rail 200 can be self-closing by the elastic restoring force of the elastic members 700, and also can be soft-closing by the buffering power of the damper 600.

Then, in the case of pulling out the transfer rail 200, the above described process can be performed in the reverse order, and thus a detailed description thereof will be omitted below.

In other words, the present invention is capable of self-closing and soft-closing the transfer rail 200 through the elastic restoring force of the elastic members 700 and the buffering power of the damper 600.

Next, as shown in FIGS. 2 to 4, the slider 400 is coupled to the body 300 and selectively slidably movable along a longitudinal direction of the body 300 during slidable movement of the transfer rail 200. For reference, in the state where the transfer rail 200 is fully pulled out from the fixed rail 100, the slider 400 remains stationary with respect to body 300, and when the transfer rail 200 is being pushed in or is pulled out in the state where it is pushed in, the slider 400 slides along the body 300. Meanwhile, since the transfer pin 500 is coupled to the slider 400, the transfer pin 500 is moved in conjunction with the movement of the slider 400.

In the present invention, a plurality of elastic members 700 is provided to connect between the body 300 and the slider 400, and the elastic members 700 are elastically compressed or stretched when the transfer rail 200 is transferred. For reference, the elastic members 700 are gradually compressed when the slider 400 and the transfer pin 500 are moved backward as the transfer rail 200 is pushed in. On the contrary, the elastic members 700 are gradually stretched when the slider 400 and the transfer pin 500 are moved forward as the transfer rail 200 is pulled out. In the state where the transfer rail 200 is pulled out, the second protrusion 530 of the transfer pin 500 enters toward the second guide path 312 while being moved along the first guide path 311. Here, the first protrusion 520 also moves eccentrically from inside the second eccentric groove 413 of the transfer pin-locking member 410 toward the first eccentric groove 412. By the movement of the first protrusion 520, the transfer rail 200 is detachable from the slider 400 and can be fully pulled out to the front.

Next, the transfer pin 500 is movable in conjunction with the slider 400 during slidable movement of the transfer rail 200, and at least a portion thereof is selectively movable along the guide path 310.

To be more specific, as shown in FIG. 5A, the transfer pin 500 includes: a pin body 510; the first protrusion 520 protruding from a first surface of the pin body 510 and being insertable through a through-hole 420 formed in the slider 400; the second protrusion 530 protruding from a second surface of the pin body 510 to correspond to the first protrusion 520 and transferable along the guide path 310 when the slider 400 is transferred; and the third protrusion 540 protruding from the second surface of the pin body 510 to be spaced apart from the second protrusion 530 and transferable along the guide path 310 when the slider 400 is transferred.

Further, in the embodiment of the present invention, the transfer pin 500 further includes a fourth protrusion 550 protruding from the first surface of the pin body 510 to correspond to the third protrusion 540. The meaning of 'correspond' described above means a corresponding position.

Firstly, the first protrusion 520 is configured to be insertable through the through-hole 420 formed in the slider 400. Herein, the through-hole 420 is elongated in a direction intersecting the moving direction of the slider 400 with respect to the body 300, and the first protrusion 520 is movable along a longitudinal direction of the oblong through-hole 420.

In the present invention, when the transfer rail 200 is pushed in, the first protrusion 520 enters inside the first eccentric groove 412 of the transfer pin-locking member 410, and as the transfer rail 200 is kept being pushed in, the first protrusion enters inside the second eccentric groove 413. Here, the second protrusion 530 disposed inside the second guide path 312, and the third protrusion 540 disposed inside the first guide path 311 are moved to inside the first guide path 311 as the first protrusion 520 is moved, as described above. Whereby, the transfer rail 200, specifically, the transfer pin-locking member 410, the transfer pin 500, and the slider 400 are integrally movable (in a direction where the transfer rail is pushed in).

Next, the second protrusion 530 is provided at the lower portion of the pin body 510 to correspond to the first protrusion 520, and as described above, its position is changed from inside the second guide path 312 toward the first guide path 311 in conjunction with the movement of the first protrusion 520 by being coupled with the transfer pin-locking member 410.

Next, the third protrusion 540 protrudes from the second surface of the pin body 510 to be spaced apart from the second protrusion 530, and is transferred along the guide path 310 when the slider 400 is transferred.

As shown in FIGS. 1, and 7 to 12, in the present invention, the transfer rail 200 is provided with the transfer pin-locking member 410 configured to be brought into contact with the slider 400 and the transfer pin 500 when sliding.

The transfer pin-locking member 410 is provided with the eccentric groove 411 configured to receive a portion of the transfer pin 500 (the first protrusion) so as to slidably move the portion of the transfer pin 500 (the first protrusion) in the state of being moved eccentrically with a predetermined radius as the transfer pin 500 is slidably moved by the slider 400. Since the eccentric movement has been described above, a description thereof will be omitted below.

Herein, the eccentric groove 411 includes: the first eccentric groove 412 provided along a longitudinal direction of the transfer pin-locking member 410 to receive the first protrusion 520 of the transfer pin 500 when the transfer rail 200 is moved; and the second eccentric groove 413 provided to be bent at an end of the first eccentric groove 412.

Herein, the bending direction of the second guide path 312 with respect to the first guide path 311 and the bending direction of the second eccentric groove 413 with respect to the first eccentric groove 412 are opposite to each other. In the beginning when the transfer rail 200 is pushed in, the first protrusion 520 enters inside the first eccentric groove 412, the second protrusion 530 is disposed in the second guide path 312, and the third protrusion 540 is disposed in the first guide path 311. After that when the transfer rail 200 is further pushed in, the first protrusion 520 is eccentrically moved inside the second eccentric groove 413, and the second protrusion 530 and the third protrusion 540 are disposed in the first guide path 311.

Hereinbelow, reference will be made to the sub-transfer pin 800.

As shown in FIGS. 2, 4, 8, and 12, the slide device slide device according to the embodiment of the present invention further includes the sub-transfer pin 800 interposed between the rod end portion of the damper and the transfer pin 500, and configured to be hingedly rotatable relative to the transfer pin 500 and to be movable simultaneously at the time of movement of the rod end portion. In other words, the rod end portion of the damper 600 is not directly connected to the transfer pin 500, but connected thereto via the sub-transfer pin 800. Herein, damper 600 may be, for example, an air cylinder or a hydraulic cylinder.

In the embodiment of the present invention, as shown in FIGS. 2 to 4, the rod end portion of the damper 600, the transfer pin 500, and the sub-transfer pin 800 are detachably coupled to each other. In this case, it is possible to increase the efficiency of part replacement and make it possible to perform a rapid part replacement work compared to the case, for example, where the rod end portion of the damper 600 is integrally coupled to the sub-transfer pin 800 or the sub-transfer pin 800 is integrally coupled to the transfer pin 500.

The present invention, for example, if at least one of the damper 600, the transfer pin 500, and the sub-transfer pin 800 fails, a worker can release the current coupling of the damper 600, the transfer pin 500, and the sub-transfer pin 800 and then replace them with new parts easily and quickly. For reference, for example, in the state where the rod end portion of the damper 600 is integrally coupled to the sub-transfer pin 800, if the problem occurs on the damper 600 or the sub-transfer pin 800, the worker cannot replace only one of them, and both assemblies are required to be replaced, causing problems in replacement and repair. A structure for enabling detachable coupling between each other will be described hereinafter.

Further, the present invention is configured such that the rod end portion of the damper 600 is detachably coupled to the sub-transfer pin 800, thereby making it possible to further facilitate the mutual coupling between the related components. For reference, for example, in the case where the rod end portion of the damper 600 is designed to be fixedly coupled to the slider 400, specifically, not to be detachable therefrom, it is difficult for the coupling operation between the slider 400 and the body 300, and the rod end portion of the damper 600 and the slider 400 to be performed quickly due to the narrow space for coupling the parts.

However, the present invention is configured such that the rod end portion of the damper 600 is detachably coupled to the sub-transfer pin 800, whereby even if the space for coupling the parts (the narrow space in the slide device) is narrow, it is possible to more easily couple the parts with each other compared to the case described above, and if necessary, the separation is also easy.

Meanwhile, as shown in FIG. 5B, the sub-transfer pin 800 includes: a sub-transfer pin main body 810; a rod coupling groove 820 provided on a side of the sub-transfer pin main body 810 and detachably coupled to the damper 600; and a protrusion insertion groove 830 provided on a side of the sub-transfer pin main body 810 and detachably coupled to the transfer pin 500.

In the embodiment of the present invention, the sub-transfer pin 800 is provided with the rod coupling groove 820 at a side thereof, to allow the rod end portion of the damper 600 insertedly coupled thereto, and the rod end portion of the damper 600 is provided with a concave neck 610 to reduce a cross sectional area thereof. Further, the rod coupling groove 820 is provided with a neck insertion protrusion 840 insertable into the neck 610.

To be more specific, the neck insertion protrusion 840 protrudes from each of a pair of inner walls facing each other, of the inner walls forming the rod coupling groove 820, and the neck insertion protrusion 840 is insertable into the neck 610 of the damper 600. Accordingly, in the state where the rod end portion of the damper 600 is inserted in the rod coupling groove 820, the neck insertion protrusion 840 is inserted in the neck 610 of the damper 600. Here, a rod of the damper 600 is stopped by the neck insertion protrusion 840, thereby being coupled to each other.

Further, in the embodiment of the present invention, as shown in FIGS. 5A and 5B, the transfer pin 500 further includes a fourth protrusion 550 protruding from the first surface of the pin body 510 to correspond to the third protrusion 540. Further, the sub-transfer pin 800 is further provided with the protrusion insertion groove 830 to allow the fourth protrusion 550 to be inserted thereinto. Herein, the fourth protrusion 550 is not forced into the protrusion insertion groove 830, whereby the transfer pin 500 is rotatable about the protrusion insertion groove 830 of the sub-transfer pin 800.

The rotation of the transfer pin 500 about the sub-transfer pin 800 occurs at the time when the second protrusion 530 of the transfer pin 500 is moved from the first guide path 311 toward the second guide path 312 or from the second guide path 312 toward the first guide path 311, which has been described above in detail, and thus a description thereof will be omitted below.

Further, in the embodiment of the present invention, as shown in FIGS. 2 to 4, and 6, the damper 600 is provided with a damper protruding portion 620 protruding at a back thereof, and the body 300 is provided with a damper protruding portion-insertion groove 320 allow the damper protruding portion 620 of the damper 600 to be inserted thereinto. Herein, the damper protruding portion 620 is forced into the damper protruding portion-insertion groove 320. Accordingly, it is possible to couple the damper 600 to the body 300 more simply and quickly, and it is possible to reduce manufacturing cost since a separate coupling part such as a bolt or the like for mutual coupling is not required.

To be more specific, as shown in FIG. 6, the damper protruding portion 620 is configured such that a cross section thereof is in an annular shape, and the damper protruding portion-insertion groove 320 may include an annular first insertion groove 321 with the damper protruding portion 620 inserted thereinto, and a straight second insertion groove 322 communicating with the second insertion groove 322 and having a width smaller than a diameter of the second insertion groove 322. In the present invention, the body 300 may be made of a plastic or metal material having a predetermined elasticity.

In this structure, when the damper protruding portion 620 passes through the second insertion groove 322, the second insertion groove 322 may be expanded to a predetermined extent and then restored to the initial shape when the damper protruding portion 620 is completely moved inside the first insertion groove 321.

The present invention is configured such that the rod end portion of the damper 600 is directly connected to the sub-transfer pin 800, and the transfer pin 500 is hingedly rotatable about the sub-transfer pin 800 according to the reciprocating movement of the transfer rail 200, whereby it is possible to further simplify the coupling structure of the slider 400 and the surrounding structure to facilitate the coupling and separation, and it is possible to increase the durability of the slider 400. For reference, the present invention has an excellent durability compared to the case, for example, where the rod end portion of the damper 600 is directly connected to the slider 400, since the impact due to the operation of the damper 600 is not directly transmitted to the slider 400.

For example, in the case where the rod end portion of the damper 600 is connected to the slider 400 provided in the transfer rail 200, the slider 400 should be provided with a first coupling structure for being coupled with the rod end portion of the damper 600, and a second coupling structure for being coupled with the transfer pin 500 movable along the guide path 310 provided in the fixed rail 100. Accordingly, the structure of the slider 400 may be complicated, and also the durability of the slider 400 is reduced during long-term reciprocating movement because both the rod end portion of the damper 600 and the transfer pin 500 are coupled thereto. The present invention is configured such that the sub-transfer pin 800 is additionally provided between the rod end portion of the damper 600 and the transfer pin 500, whereby it is possible to prevent the occurrence of the above described problem.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A slide device, comprising:
   a fixed rail to be fixed to a main body;
   a transfer rail slidably movable relative to the fixed rail so as to induce opening or closing movement of a drawer body;
   a body provided at an end portion of a side of the fixed rail, the body having a guide path;
   a slider coupled to the body, the slider being selectively slidably movable along a longitudinal direction of the body during slidable movement of the transfer rail;
   a transfer pin coupled to the slider to be movable simultaneously at the time of movement of the slider, the transfer pin being movable along the guide path; and
   a damper provided in the body, the damper having a rod end portion connected to the transfer pin; and
   a sub-transfer pin interposed between the rod end portion of the damper and the transfer pin, the sub-transfer pin being hingedly rotatable about the transfer pin and movable simultaneously at the time of movement of the rod end portion,
   wherein the rod end portion of the damper is provided with a concave neck to reduce a cross sectional area thereof;
   the sub-transfer pin has a rod coupling groove at a side thereof to allow the rod end portion of the damper to be engaged therewith; and
   the rod coupling groove has a neck insertion protrusion insertable into the concave neck.

2. The slide device of claim 1, wherein the rod end portion of the damper, the transfer pin, and the sub-transfer pin are detachably coupled to each other.

3. The slide device of claim 1, wherein the transfer pin includes:
   a pin body;
   a first protrusion protruding from a first surface of the pin body and being insertable through a through-hole formed in the slider;
   a second protrusion protruding from a second surface of the pin body to correspond to the first protrusion and transferable along the guide path when the slider is transferred;
   a third protrusion protruding from the second surface of the pin body to be spaced apart from the second protrusion and transferable along the guide path when the slider is transferred; and
   a fourth protrusion protruding from the first surface of the pin body to correspond to the third protrusion;
   wherein the sub-transfer pin is provided with a protrusion insertion groove to allow the fourth protrusion to be inserted thereinto; and
   the transfer pin is rotatable about the protrusion insertion groove of the sub-transfer pin.

4. The slide device of claim 1, wherein the damper has a damper protruding portion protruding at a back thereof; and
   the body has a damper protruding portion-insertion groove into which the damper protruding portion of the damper is forcibly inserted.

5. The slide device of claim 4, wherein the damper protruding portion has a cross section of an annular shape; and
   the damper protruding portion-insertion groove includes an annular first insertion groove with the damper protruding portion inserted thereinto, and a straight second insertion groove communicating with the annular first insertion groove and having a width smaller than a diameter of the annular first insertion groove.

* * * * *